United States Patent [19]
Even

[11] Patent Number: 5,101,431
[45] Date of Patent: Mar. 31, 1992

[54] SYSTOLIC ARRAY FOR MODULAR MULTIPLICATION

[75] Inventor: Shimon Even, Haifa, Israel

[73] Assignee: Bell Communications Research, Inc., Livingston, N.J.

[21] Appl. No.: 628,570

[22] Filed: Dec. 14, 1990

[51] Int. Cl.$^5$ .................. H04L 9/30; G06F 7/52; G06F 7/72

[52] U.S. Cl. .................. 380/30; 380/28; 364/746; 364/746.1

[58] Field of Search ............ 364/200, 900, 224, 224.3, 364/260.81, 931.01, 931.02, 937.18, 739, 744, 746, 746.1

[56] References Cited

PUBLICATIONS

"A Survey of Hardware Implementations of RSA", E. F. Brickell, presented at CRYPTO '89, Santa Barbara, Calif., Aug. 1989.
"A Cryptographic Library for the Motorola DSP 56000", S. R. Dusse et al., EuroCrypt 90—Abstracts, May 21-24, 1990, Scantic on Arhus, Denmark, pp. 230-244.
"VICTOR, An Efficient RSA Hardware Implementation", H. Orup et al., EuroCrypt 90—Abstracts, May 21-24, 1990, Scanticon Arhus, Denmark, pp. 245-252.
"A One-Dimensional Real Time Iterative Multiplier", A. J. Atrubin, IEEE Trans. on Electronic Computers, vol. 14, pp. 394-399, 1965.
"Modular Multiplication Without Trial Division", P. L. Montgomery, Math. of Computation, vol. 44, pp. 519-521, 1985.

Primary Examiner—Bernarr E. Gregory
Attorney, Agent, or Firm—Leonard Charles Suchyta

[57] ABSTRACT

A systolic array (10) comprising a sequence of identical cells is utilized to perform modular reduction in linear time. Each cell receives a binary number at a first input and an n-bit modulus at a second input and performs binary addition to form a binary number output. The systolic array (10) for performing modular reduction may be combined with Atrubin's array (60) to perform modular multiplication.

10 Claims, 3 Drawing Sheets

SYSTOLIC ARRAY FOR MODULAR MULTIPLICATION

FIELD OF THE INVENTION

The present invention relates to a systolic array for performing modular reduction. The inventive array is especially useful in cryptographic systems where repeated modular multiplication is utilized.

BACKGROUND OF THE INVENTION

A public key cryptography system is made up of a collection of users, each having his own encryption and decryption keys. In one such system, known as the RSA system, the encryption key comprises two integers N and e and the decryption key is single integer d. The integers N, d, and e are typically very large integers whose binary representations typically involve several hundred bits. Each user makes his encryption key available to the other users while keeping his decryption key secret.

In this system, N is an integer which is the product of two carefully selected large primes p and q and e is an integer such that its greatest common divisor with $(p-1)(q-1)$ is one $[gcd \{e,(p-1)(q-1)\}=[$. Finally, d is calculated by solving the linear congruence $$de \equiv 1 \ (mod(p-1)(q-1))$$

If a user A wishes to communicate a numerically coded message M to another user B he calculates the ciphertext $K=M^e(mod\ N)(0 \leq K < N,\ 0 \leq M < N)$ where e and N form the encryption key for user B. To determine the plaintext M from the ciphertext K, B uses the decryption key d to calculate $$M = K^d(mod\ N)\ (0 \leq M < N)$$

Thus, both the encryption and decryption operations involve repeated modular multiplications where the modulus N has a representation involving hundreds of bits.

As a result, great effort has been expended in the field of cryptography to find fast and inexpensive ways to do modular multiplication (see, e.g., E.F. Brickell "A Survey of Hardware Implementations of RSA" presented at CRYPTO'89, Santa Barbara, Calif., August 1989; S.R. Dusse et al, "A Cryptographic Library for the Motorola DSP 56000" EuroCrypt 90—Abstracts, May 21-24, 1990, Scanticon Arhus, Denmark, pp. 213-217; H. Orup et al, "VICTOR, An Efficient RSA Hardware Implementation" Eurocrypt 90—Abstracts, May 21-24 1990 Scanticon, Arhus, Denmark, pp. 219-227).

A systolic array of cells for performing ordinary (i.e. not modular) multiplication of large integers has been proposed by Atrubin (see, A.J. Atrubin, "A One-Dimensional Real Time Iterative Multiplier", IEEE Trans. on Electronic Computers, Vol. 14, 1965, pp. 394-399). Two positive integers to be multiplied are represented in binary. They are fed serially to the first cell of the array, least significant bit first. The product is supplied by the first cell, least significant bit first, without delay. The time required to obtain the product is linear with the length of the product. The structure of each cell in Atrubin's array is very simple and the array utilizes no long distance communications, i.e., each cell communicates only with its neighbors. Thus, a very high clock rate is possible.

It is an object of the present invention to provide a systolic array of cells which can be utilized in combination with Atrubin's array to perform repetitive modular multiplications of the type utilized in the above-described public key cryptographic systems.

As is shown below the inventive systolic array utilizes the modular reduction system proposed by Montgomery (see, P.L. Montgomery, "Modular Multiplication Without Trial Division", Math. of Computation, Vol. 44, 1985, pp. 519-521).

The modular reduction system of Montgomery may be understood as follows. Let the modulus N be an odd integer. Let n be the number of bits in the binary representation of N i.e. $2^{n-1} < N < 2^n$. Let $R = 2^n$. Let $\bar{x}$ be the image of the integer where $\bar{x} = xR(mod\ N)$. A binary representation of an image has at most n bits and it may exceed N, but it is nonnegative.

In the Montgomery modular multiplication system, modular operations are done with images. For example, suppose one wants to multiply two numbers x and y to obtain a product $z = xy(mod\ N)$. In the Montgomery system this is done by multiplying $\bar{x}$ and $\bar{y}$ to obtain $M = \bar{x}\bar{y} = xyR^2(mod\ N) = zR^2\ (Mod\ N) = z\bar{R}(Mod\ N)$. Note that M has at most 2n bits and z is non-negative and has at most n bits.

In order to obtain $\bar{z}$ from M it is necessary to divide M by R and in order to obtain z from $\bar{z}$ it is necessary to divide again by R. This modular division by R is known as modular reduction.

Thus, it is a further object of the present invention to provide a systolic array of cells to perform the above-described modular reduction operation and to utilize the systolic array to perform repeated modular multiplications in a cryptographic system.

SUMMARY OF THE INVENTION

In accordance with the present invention, the computation $MR^{-1}\ (mod\ N)$ is performed using the following algorithm.

begin
  $M^0 \leftarrow M$
  for i=1 to n do
  begin
    $M^i \leftarrow M^{i-1} + NM_0^{i-1}$
    Shift-right $M^i$, one bit
  end
  if $M^n \geq 2^n$ then $M^n \leftarrow M^n - N$
end where $M^0\text{-}M$ is the number to be reduced, $M^n = M^0 R^{-1}(mod\ N)$, and $M_0^i$ is the least significant bit of the binary number $M^i$.

An array for carrying out this algorithm to perform a modular reduction comprises a sequence of cells $C^i$, $i = 1, \ldots, n$. Each of the cells $C^i$ except the first cell $C^1$ has a first input for serially receiving a binary number $M^{i-1}$ from the immediately preceding cell $C^{i-1}$ in the sequence. The first cell $C^1$ has a first input for serially receiving the binary number $M = M^0$ to be reduced from an external source. Each cell in the sequence also has a second input for serially receiving an n-bit modulus N. A serial adder in each cell serially performs the binary operation $M^i = M^{i-1} + NM_0^{i-1}$ and each cell includes means for affecting a one bit shift right operation on the binary number $M^i$. Each cell except the last cell in the sequence has an output for serially transmitting $M^i$ to the first input of the next cell in the sequence. The last cell has an output for serially outputting a binary number $M^n$ which is equal to $M^0 R^{-1}\ (mod\ N)$.

The output of the last cell is connected to a subtraction circuit for subtracting N from $M^n$ if $M^n \geq 2^n$.

In short, the present invention is a systolic array with a very simple cell structure for performing modular reduction in linear time. The systolic array may be combined with Atrubin's array to perform modular multiplication in linear time.

DETAILED DESCRIPTION OF THE INVENTION

Figure 1:
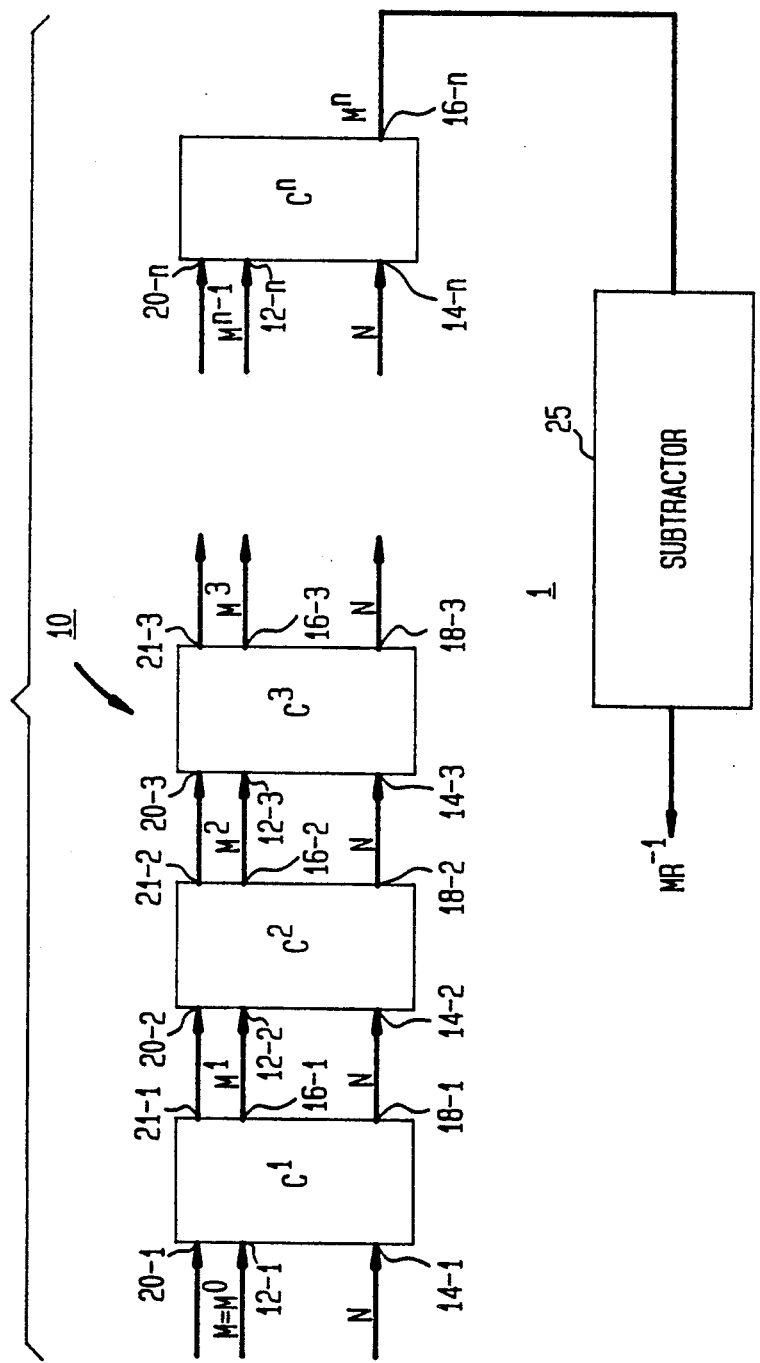
FIG. 1 illustrates a systolic array for performing a modular reduction, in accordance with an illustrative embodiment of the present invention.

FIG. 1 illustrates a circuit 1 for performing modular reduction. The circuit 1 comprises a systolic array 10. The systolic array 10 comprises a sequence of cells $C^1$, $C^2$, ..., $C^n$. Each cell $C^i$ has two inputs 12-i and 14-i. Thus the cell $C^1$ has the inputs 12-1 and 14-1 and the Cell $C^n$ has the inputs 12-n and 14-n. Each cell $C^i$ except the last cell $C^n$ also has two outputs 16-i and 18-i. Thus, the cell $C^1$ has the outputs 16-1 and 18-1. The last cell $C^n$ has one output which is designated 16-n. The inputs 12 and 14 of each cell except the first cell are connected to the corresponding outputs 16 and 18 of the preceding cell in the array.

Each cell $C^i$ has an input 20-i and an output 21-i by which a timing signal is passed from cell to cell.

Each cell in the array 10 except the first cell receives all its inputs from the preceding cell in the array and each cell except the last cell transmits all its outputs to the next succeeding cell in the array. Each input 14-i of the cell $C^i$ serially receives the modulus N least significant bit first. Each bit in the binary representation of the modulus N is delayed by two clock cycles in each cell and is then outputted at the output 18-i for transmission to the next cell. The input 12-1 of the first cell $C^1$ serially receives, least significant bit first, the binary number $M = M^0$ to be reduced. The remaining cells $C^i$ serially receive at their inputs 12-i the binary number $M^{i-1}$ from the output 16-i-1 of the preceding cell. Each cell includes a serial adder for performing the operation $M^i = M^{i-1} + NM_0^{i-1}$, where $M_0^{i-1}$ is the least significant bit of $M^{i-1}$, and means for affecting a one bit shift-right operation on $M^i$. The binary number $M^i$ is serially outputted at the output 16-i. The output 16-n of the last cell $C^n$ is connected to a subtractor circuit 25. The subtractor 25 performs the operation $M^n \leftarrow M^n - N$ if $M^n \geq 2^n$. The output of the subtractor is $MR^{-1}(\text{mod } N)$.

Figure 2:
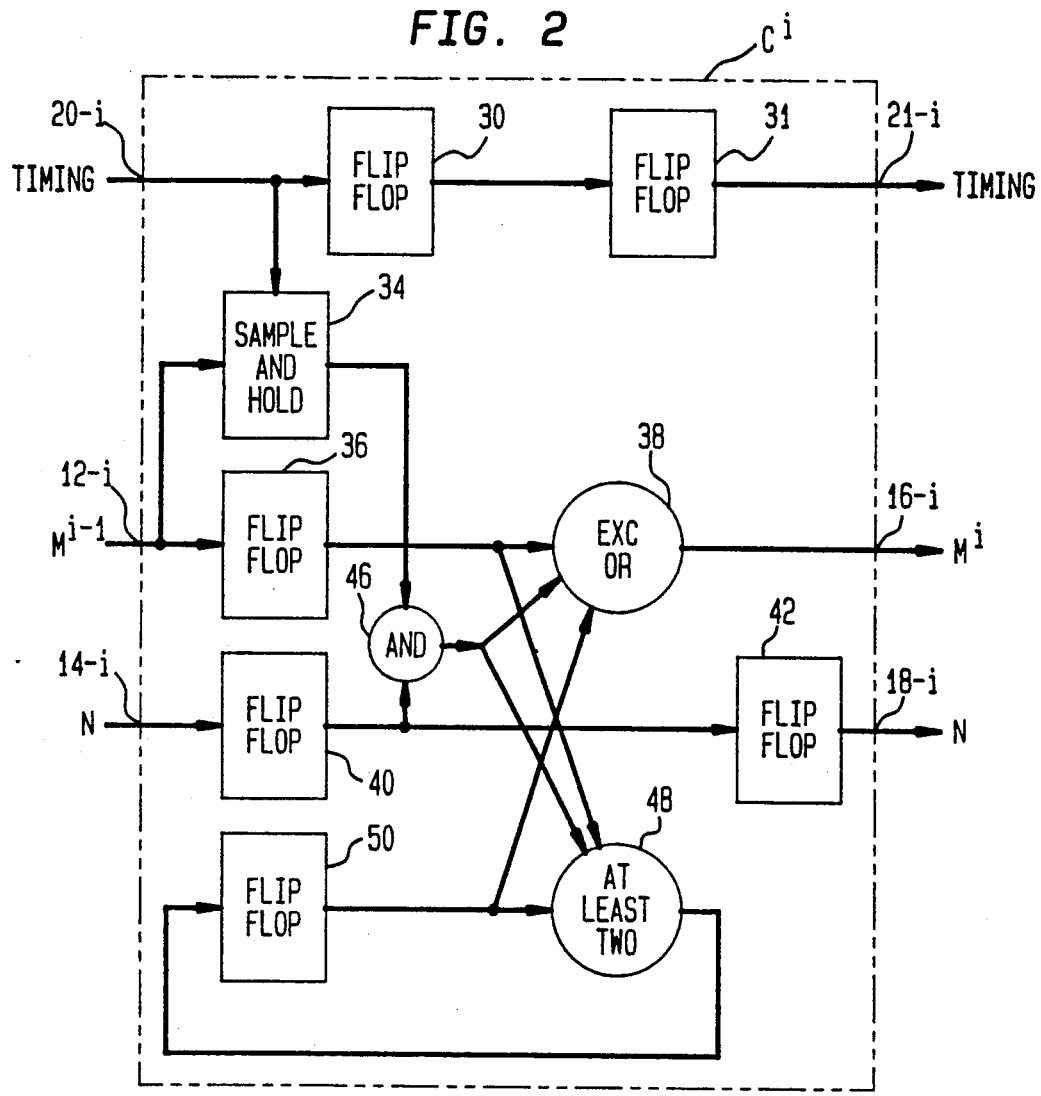
FIG. 2 is a block diagram which illustrates one of the cells in the array of FIG. 1, in accordance with an illustrative embodiment of the present invention.

A cell $C^i$ is shown in greater detail in FIG. 2.

A timing signal enters the cell $C^i$ of FIG. 2 at input 20-i and leaves via the output 21-i. There are two delay flip-flops 30 and 31 in the path of the timing signal. The flip-flops 30 and 31 are delay flip-flops so that the output of each flip-flop at time $t+1$ is equal to its input at time $t$. Thus, there is a delay of two time units in the path of the timing signal.

As seen by the input 20-1 of the cell $C^1$ (see FIG. 1), the timing signal comprises a "one" pulse followed by $2n-1$ "zero" pulses. Because the "one" pulse is delayed by two time units in each cell, the one pulse arrives at the input 20-i of the cell $C^i$ at time $2i-1$.

The binary number $M^{i-1}$ is received serially at the input 12-i, is delayed one time unit by the delay flip-flop 36 and is connected to an input of the exclusive-OR gate 38.

When the one pulse arrives at the input 20-i of the cell $C^i$ of FIG. 2, the bit value of $M^{i-1}$ which arrives at the input 12-i is held by the sample and hold circuit 34.

The modulus N is received serially at the input 14-i and is outputted serially at the output 18-i. There are two delay flip-flops 40 and 42 in the path between the modulus input 14-i and the modulus output 18-i. The output of the flip-flop 40 is connected to one input of the AND-gate 46. The second input of the AND-gate 46 is connected to the sample and hold 34. The output of the AND-gate 46 is connected to an input of the exclusive OR-gate 38 and to an input of the AT LEAST TWO Gate 48.

The AT LEAST TWO gate 48 has three inputs, the first of which is connected to the delay flip-flop 50, the second of which is connected to the AND-gate 46, and the third of which is connected to the flip-flop 36. The output of the AT LEAST TWO gate 48 is a "one" when at least two of the three inputs are "one". The exclusive-OR gate 38 has three inputs, the first of which is connected to the flip-flop 36, the second of which is connected to the AND-gate 46, and the third of which is connected to the flip-flop 50. The output of the exclusive-OR gate 38 is a "one" when one of the inputs is "one" and the other two inputs are "zero". In the cell $C^i$ of FIG. 2, all flip-flops are reset to produce a "zero" output at time $t=1$.

The exclusive-OR gate 38 and the AT LEAST TWO gate 48 in combination with the flip-flop 50 form a serial adder for serially performing the addition $M^i = M^{i-1} + NM_0^{i-1}$. The binary number $M^i$ is transmitted serially from the output of the exclusive-OR gate 38 to the cell output 16-i. The carry bit of the serial addition operation is generated at the output of the AT LEAS TWO gate 48 and is delayed for one time unit by the flip-flop 50. The serial adder formed by the gates 38 and 48 adds the numbers $M^{i-1}$ and N which appears at the inputs 12-i and 14-i serially, least significant bit first, as follows. If the first bit of $M^{i-1}$ is a "one", then starting from time $2i$ (i.e. one time unit after the timing pulse arrives) the AND-gate 46 is enabled. In this case the data bits comprising the modulus N pass through the enabled AND-gate and are added serially to the bits comprising the number $M^i$. If the first bit of $M^{i-1}$ is a "zero", then the AND-gate 46 remains disabled and the data bit of $M^{i-1}$ goes through the cell unchanged, because the disabled AND-gate blocks the bit from the modulus N from entering the adder. In either case, the first output bit of $M^i$ appears on the output 16-i at time $2i$ and is always "zero". This zero is ignored by the next succeeding cell in the array thus affecting a shift-right operation on the output of $C^i$. As indicated above, the bits comprising the modulus N are delayed in the cell $C^i$ by two time units through use of the flip-flops 40 and 42 so that the least significant bit of N appears at the output 18-i at the same time the least significant bit of $M^i$ appears at the output 16-i, i.e., after the right-shift is affected.

As indicated previously, to carry out a modular reduction the circuit 1 of FIG. 1 implements the algorithm:

```
begin
    M⁰←M
    for i=1 to n do
    begin
        Mⁱ←Mⁱ⁻¹+NM₀ⁱ⁻¹
        Shift-right Mⁱ one bit
    end
    if Mⁿ≧2ⁿ then Mⁿ←Mⁿ−N
end
```

The cell $C^i$ of FIG. 1 performs the $i^{th}$ iteration of the inner loop of the algorithm. The remaining subtraction is carried by the subtraction circuit 25 of FIG. 1.

As indicated previously the circuit for performing modular reduction is especially useful for performing repetitive modular multiplications. Consider for example the repetitive multiplication $a^{19}$ (mod N). To perform this repetitive multiplication in accordance with the present invention, $a^{19}$ (mod N) may be represented as $$a^{19} \ (mod \ N) = (((((a)^2)^2)^2 a)^2 a \ (mod \ N)$$

Figure 3:
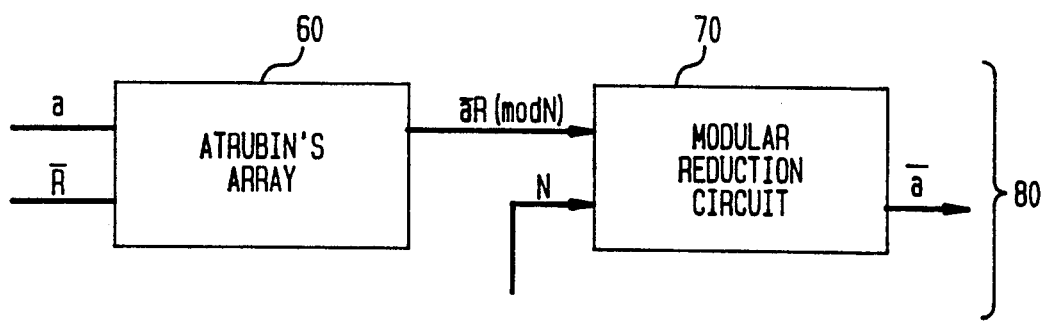
FIG. 3 illustrates a circuit for performing modular multiplication which utilizes the systolic array of FIG. 1 in accordance with an illustrative embodiment of the present invention.

This sequence of multiplications can be done using the systolic array of the present invention as follows. At the time the modulus N is chosen, the quantity $\overline{R} = R^2$ (mod N) is determined using a conventional modular multiplication technique. As shown in FIG. 3, the image $\overline{a}$ is obtained by first using Atrubin's array 60 to form the product:

$$a\overline{R} = aR^2 \ (mod \ N) = a\overline{R} \ (mod \ N)$$

Then the modular reduction circuit 70 of the present invention is used to obtain $$(\overline{a}R)R^{-1} \ (mod \ N) = \overline{a}$$

In FIG. 3, the Atrbuin's array 60 and the modular reduction circuit 70 may be viewed as forming a single multiplier circuit 80.

Figure 4:
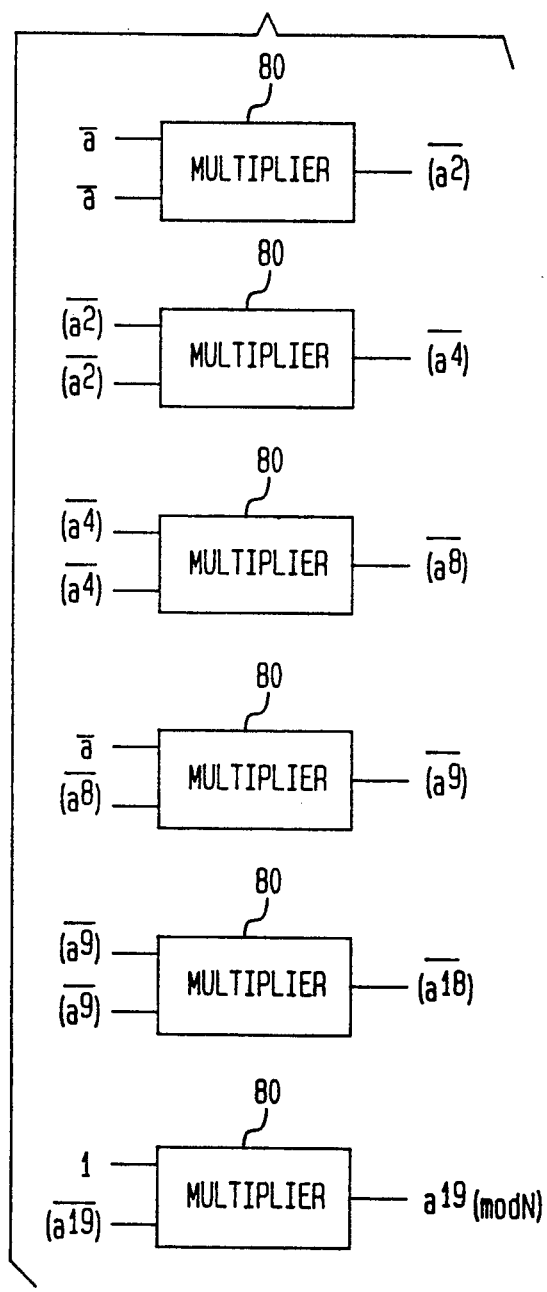
FIG. 4 shows how repetitive multiplications are performed using the array of FIG. 1.

FIG. 4 shows the sequence of multiplications performed by the multiplier circuit 80 to go from $\overline{a}$ to $a^{19}$ (mod N).

Thus the inventive modular reduction circuit may be utilized to easily perform the repetitive modular multiplications of the type utilized in public key cryptographic systems.

Finally, the above-described embodiments of the invention are intended to be illustrative only. Numerous alternative embodiments may be devised by those skilled in the art without departing from the spirit and scope of the following claims.

I claim:

1. A circuit for performing a modular reduction comprising
    a sequence of connected cells $C^i$, i=1, ..., n
    each of said cells $C^i$ comprising:
    a first input for serially receiving a binary number $M^{i-1}$ and a second input for serially receiving an n-bit modulus N,
    adding means for serially performing binary addition to form the binary number $M^i \leftarrow M^{i-1} + NM_0^{i-1}$, wherein $M_0^{i-1}$ is the least significant bit of $M^{i-1}$,
    means for causing a one-bit shift-right operation on said binary number $M^i$, and
    an output for serially outputting said binary number $M^i$,
    wherein the first input of the first cell $C^1$ in said sequence receives a binary number $M^0$, wherein the output of cell $C^i$, i=1, ..., n−1, is the binary number $M^i$ and is connected to said first input of the next adjacent cell, and wherein the output of said last cell $C^n$ in said sequence outputs a binary number $M^n$ which is equal to $M^0 R^{31\ 1}$ (mod N), where $R = 2^n$.

2. The circuit of claim 1 wherein said circuit further includes subtraction means connected to said output of said last cell for subtracting N from $M^n$ if $M^n \geq 2^n$.

3. The circuit of claim 1 wherein the output of each cell $C^i$ in said sequence except the last cell is connected to the first input of the next succeeding cell in said sequence.

4. The circuit of claim 1 wherein said means for causing a one-bit shift-right operation comprises means for insuring that the first bit of $M^i$ is a "zero".

5. The circuit of claim 1 wherein said first input of said first cell $C^1$ in said sequence receives said binary number $M^0$ from a systolic array for performing ordinary multiplication.

6. A circuit for performing modular reduction comprising
    a first systolic array for performing ordinary multiplication, and
    a second systolic array for performing a modular reduction on a product produced by said first systolic array,
    said second systolic array comprising a sequence of cells $C^i$, i=1, ..., n, each of said cells $C^i$ except the first cell having a first input for serially receiving a binary number $M^{i-1}$ from the preceding cell in the sequence, each of said cells having a second input for receiving an n-bit modulus N, and each of said cells having serial adder means for performing the addition $M^{i-1} + NM_0^{i-1}$, where $M_0^{i-1}$ is the least significant bit in $M^{i-1}$, to form the binary number $M^i$, wherein the first cell in said sequence has an input for receiving a binary number $M^0$ to be modularly reduced, each of said cells has an output, and each of said cells, except the last in said sequence, has its output connected to said first input of the next adjacent cell.

7. The circuit of claim 6 wherein said binary number $M^0$ is received at the input of the first cell from the first systolic array.

8. The circuit of claim 6 wherein said first systolic array is Atrubin's array.

9. The circuit of claim 6 wherein each cell $C^i$ in said second systolic array includes means for insuring that the first bit of $M^i$ is a "zero".

10. The circuit of claim 6 wherein a subtractor circuit is connected to an output the last cell in said second systolic array for subtracting N from $M^n$ if $M^n \geq 2^n$.

* * * * *